(12) United States Patent
Ishizaki et al.

(10) Patent No.: US 7,332,201 B2
(45) Date of Patent: Feb. 19, 2008

(54) OPTICALLY FUNCTIONAL LAYER, METHOD OF FORMING OPTICALLY FUNCTIONAL LAYER, AND LIQUID CRYSTAL DISPLAY ELEMENT

(75) Inventors: Kouji Ishizaki, Tokyo (JP); Norihisa Moriya, Tokyo (JP); Yukiko Iizuka, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 172 days.

(21) Appl. No.: 10/933,100

(22) Filed: Sep. 2, 2004

(65) Prior Publication Data
US 2005/0092965 A1 May 5, 2005

(30) Foreign Application Priority Data
Sep. 8, 2003 (JP) ............... 2003-314900

(51) Int. Cl.
C09K 19/52 (2006.01)
C09K 19/54 (2006.01)

(52) U.S. Cl. .................... 428/1.1; 428/1.3; 428/1.5

(58) Field of Classification Search ............ 428/1.1, 428/1.2, 1.3, 1.5; 252/299.01, 299.5
See application file for complete search history.

(56) References Cited

U.S. PATENT DOCUMENTS

| 5,560,864 | A | 10/1996 | Goulding | |
|---|---|---|---|---|
| 5,798,147 | A | 8/1998 | Beck et al. | |
| 6,180,028 | B1 * | 1/2001 | Hotaka et al. | 252/299.66 |
| 6,291,035 | B1 | 9/2001 | Verrall et al. | |
| 6,319,963 | B1 | 11/2001 | Coates et al. | |
| 6,803,985 | B2 * | 10/2004 | Kawamoto et al. | 349/187 |
| 6,882,386 | B2 * | 4/2005 | Moon et al. | 349/98 |
| 7,011,775 | B2 * | 3/2006 | Motomura et al. | 264/1.34 |
| 7,068,345 | B2 * | 6/2006 | Kashima | 349/183 |
| 2003/0090617 | A1 * | 5/2003 | Kawamoto et al. | 349/187 |
| 2003/0152712 | A1 * | 8/2003 | Motomura et al. | 427/402 |
| 2004/0130670 | A1 * | 7/2004 | Kashima | 349/122 |

FOREIGN PATENT DOCUMENTS

| JP | 7-258638 | 10/1995 |
|---|---|---|
| JP | 8-245960 | 9/1996 |
| JP | 9-053074 | 2/1997 |

(Continued)

OTHER PUBLICATIONS

English translation bu computer for JP 2003-207642, http://www4.ipdl.ncipi.go.jp/Tokujitu/PAJdetail.ipdl?N0000=60&N0120=01&N2001=2&N3001=2003-207642.*

(Continued)

*Primary Examiner*—Shean C Wu
(74) *Attorney, Agent, or Firm*—Ladas & Parry LLP (57) ABSTRACT

The present invention is to solve a problem that, conventionally, there is a risk of impurity elution when the optical retardation control layer obtainable by photopolymerization comes into contact with the liquid crystal layer because of the deterioration in heat resistance of the optical retardation control layer due to high temperature of post-process, the insufficient chemical resistance or the like. α-amino alkylphenone based 2-methyl-1[4-(methylthio)phenyl]-2-morpholinopropane-1-one or 2-benzyl-2-dimethylamino-1-(4-morpholinophenyl)-butanone-1 are used as a photopolymerization initiator to be compounded in a composition for forming an optical retardation control layer or other optically functional layers.

7 Claims, 3 Drawing Sheets

- 1 liquid crystal display element
- 2A polarizer
- 3A phase difference plate
- 4A 1st substrate
- 5 color filter layer
- 6C orientation layer
- 7 optical retardation control layer
- 8 transparent electrode layer
- 6A orientation layer
- 9 liquid crystal layer
- 6B orientation layer
- 10 electrode layer (TFT)
- 4B 2nd substrate
- 3B phase difference plate
- 2B polarizer
- 11 backlight

FOREIGN PATENT DOCUMENTS

| | | | |
|---|---|---|---|
| JP | 10-508882 | | 9/1998 |
| JP | 2000-95883 | | 4/2000 |
| JP | 2001-500984 | | 1/2001 |
| JP | 2001-56484 | | 2/2001 |
| JP | 2003-207642 | * | 7/2003 |

OTHER PUBLICATIONS

CAPLUS 1999: 487359.*
CAPLUS 1999: 113765.*

* cited by examiner

FIG. 1

1 liquid crystal display element
2A polarizer
3A phase difference plate
4A 1st substrate
5 color filter layer
6C orientation layer
7 optical retardation control layer
8 transparent electrode layer
6A orientation layer
9 liquid crystal layer
6B orientation layer
10 electrode layer (TFT)
4B 2nd substrate
3B phase difference plate
2B polarizer
11 backlight

OPTICALLY FUNCTIONAL LAYER, METHOD OF FORMING OPTICALLY FUNCTIONAL LAYER, AND LIQUID CRYSTAL DISPLAY ELEMENT

BACKGROUND OF THE INVENTION

1. Field of the Invention

The present invention relates to an optically functional layer comprising a cured product of polymerizable liquid crystal composition by polymerization such as an optical retardation control layer, a color filter layer, a polarizing control layer or the like, which is particularly suitable for applying to various displays, notably, a liquid crystal display.

The present invention also relates to a method of forming the optically functional layer, and a liquid crystal display element using the optically functional layer.

2. Description of the Related Art

In order to form an optically functional layer such as the above mentioned optical retardation control layer or the like using a polymerizable liquid crystal composition, it is necessary to employ a method comprising steps of applying a polymerizable liquid crystal composition on a substrate and subjecting the applied substrate to exposure to cure the composition by polymerization. It is also necessary to use a photopolymerization initiator to initiate radical reaction with the exposure light. For example, benzil dimethyl ketal based 2,2-dimethoxy-1,2-diphenylethane-1-one (manufactured by Chiba Specialty Chemicals, Inc.; product name: Irgacure 651) may be used (for example, Kohyo (Japanese Unexamined Patent Publication) No. 2001-500984, p. 21). Alternatively, besides the above mentioned, α-hydroxyketone based 1-hydroxy-cyclohexyl-phenyl-ketone (manufactured by Chiba Specialty Chemicals, Inc.; product name: Irgacure 184), α-hydroxyketone based 2-hydroxy-2-methyl-1-phenyl-propane-1-one (manufactured by Merck & Co., Inc.; product name: Darocure 1173), or Darocure 4205 (product name; manufactured by Merck & Co., Inc.; composition unknown) may be used (for example, Japanese Patent Application Laid-Open (JP-A) No. 2001-56484, p. 15).

However, the heat resistance of the optically functional layers obtained by using any of the above photopolymerization initiators was not necessarily sufficient.

Particularly, there was a risk of deteriorating a display quality level as impurity elutes into a liquid crystal layer when an optical retardation control layer comes into contact with the liquid crystal layer because of the insufficient heat resistance of the optical retardation control layer leading to the deterioration in the optical retardation control layer due to high temperature of processing after forming the optical retardation control layer, the insufficient chemical resistance of the obtained optical retardation control layer, or the like.

SUMMARY OF THE INVENTION

Therefore, problems to be solved by the present invention is to solve defect of the above mentioned conventional arts, and to improve durability such as heat resistance, chemical resistance or the like of an optically functional layer formed by using a polymerizable liquid crystal composition, particularly, an optical retardation control layer.

In a study done by the inventors of the present invention, it was found that the problems is solved by using α-amino alkylphenone based compound as a photopolymerization initiator to be compounded in a polymerizable liquid crystal composition, particularly, it significantly improves by using 2-methyl-1[4-(methylthio)phenyl]-2-morpholinopropane-1-one or 2-benzyl-2-dimethylamino-1-(4-morpholino phenyl)-butanone-1, thus, the present invention was led.

The first aspect of the present invention to solve the problem relates to an optically functional layer comprising a cured product by polymerization of a polymerizable liquid crystal composition containing a polymerizable liquid crystal monomer and a photopolymerization initiator represented by the following Formula (1) and/or a photopolymerization initiator represented by the following Formula (2):

Also, the second aspect of the present invention relates the optically functional layer of the first aspect of the present invention, wherein the polymerizable liquid crystal composition further contains a surfactant.

The third aspect of the present invention relates to a method of forming an optically functional layer comprising steps of laminating a polymerizable liquid crystal composition layer of the first or second aspect of the present invention, and subjecting the polymerizable liquid crystal composition layer to ionizing radiation to be cured by polymerization.

The forth aspect of the present invention relates to the method of forming an optically functional layer of the third aspect of the present invention, wherein the polymerizable liquid crystal composition further contains a surfactant.

The fifth aspect of the present invention relates to the method of forming an optically functional layer of the third and forth aspects of the present invention, wherein the ionizing radiation is performed under inert gas atmosphere.

The sixth aspect of the present invention is related to the method of forming an optically functional layer any of the third to fifth aspects of the present invention, wherein the temperature of the polymerizable liquid crystal composition is in the range of room temperature or higher and the temperature in which a polymerizable liquid crystal monomer becomes transparent or lower at the time of performing the ionizing radiation.

The seventh aspect of the present invention relates to the method of forming an optically functional layer any of the third to sixth aspects of the present invention, wherein development is performed to form the optically functional layer in pattern form after the ionizing radiation is performed in pattern form.

The eighth aspect of the present invention relates to the method of forming an optically functional layer any of the third to sixth aspects of the present invention, wherein after the ionizing radiation is performed in pattern form under the condition that the temperature of the polymerizable liquid crystal composition is in the range of room temperature or higher and the temperature in which a polymerizable liquid crystal monomer becomes transparent or lower, the polymerizable liquid crystal composition layer is heated to the temperature in which the polymerizable liquid crystal monomer becomes transparent so as to have a state that an uncured portion is transparent, and the ionizing radiation is performed to the state to cure the uncured portion.

The ninth aspect of the present invention relates to the method of forming an optically functional layer of the seventh aspect of the present invention, wherein heating is performed at the temperature in the range of room temperature or higher and the temperature in which a polymerizable liquid crystal monomer becomes transparent or lower after the development is performed.

The tenth aspect of the present invention relates to a liquid crystal display element comprising a liquid crystal cell for driving which is comprised of two substrates disposed to face each other, an electrode layer and an orientation layer laminated in this order on inner side of the both substrates, and a liquid crystal layer disposed between the orientation layers to be sealed, at least one polarizer disposed at outer side of the liquid crystal cell for driving, and the optically functional layer of the first or second aspect of the present invention laminated on the liquid crystal layer side of any of the substrates.

The eleventh aspect of the present invention relates to the liquid crystal display element of the tenth aspect of the present invention, wherein further a color filter layer is laminated on the liquid crystal layer side of any of the substrates.

The twelfth aspect of the present invention relates to the liquid crystal display element of the tenth or eleventh aspect of the present invention, wherein two or more optically functional layers are laminated.

The thirteenth aspect of the present invention relates to the liquid crystal display element of the twelfth aspect of the present invention, wherein two optically functional layers are directly laminated on each other.

The fourteenth aspect of the present invention relates to the liquid crystal display element of the thirteenth aspect of the present invention, wherein each optically functional layer has a transparent portion and the transparent portion of each layer overlaps.

According to the first aspect of the present invention, an optically functional layer comprising a cured product by polymerization of a polymerizable liquid crystal composition containing a particular photopolymerization initiator and having the durability such as heat resistance, chemical resistance or the like improved can be provided.

According to the second aspect of the present invention, a polymerizable liquid crystal composition contains a surfactant, thereby, an optically functional layer having further improved the orientation of the layer surface can be provided besides the effect of the first aspect of the present invention.

According to the third aspect of the present invention, a polymerizable liquid crystal composition layer of the first or second aspect of the present invention is laminated and subject to ionizing radiation to be cured by polymerization, thereby, a method of forming an optically functional layer which can improve the durability such as heat resistance, chemical resistance or the like can be provided.

According to the forth aspect of the present invention, a polymerizable liquid crystal composition contains a surfactant, thereby, a method of forming an optically functional layer in which the orientation of the layer surface is further improved can be provided besides the effect of the third aspect of the present invention.

According to the firth aspect of the present invention, the ionizing radiation is performed under inert gas atmosphere, thereby, a method of forming an optically functional layer which can sufficiently cure to the layer surface by polymerization can be provided besides the effect of the third or forth aspect of the present invention.

According to the sixth aspect of the present invention, the temperature range of layer is specified at the time of ionizing radiation, thereby, a method of forming an optically functional layer which can improve the durability such as heat resistance, chemical resistance or the like can be provided besides the effect any of the third to fifth aspects of the present invention.

According to the seventh aspect of the present invention, ionizing radiation is performed in pattern form and developed after radiation, thereby, a method of forming an optically functional layer which can form a layer in pattern form can be provided besides the effect any of the third to sixth aspects of the present invention.

According to the eighth aspect of the present invention, after the ionizing radiation is performed in pattern form at the temperature in which a polymerizable liquid crystal monomer becomes transparent or lower, heating is preformed to the temperature in which the polymerizable liquid crystal monomer becomes transparent so as to make an uncured portion transparent, and again the ionizing radiation is performed, hence, two kinds of portions, anisotropic and isotropic portions, are formed but it is one layer as a whole, thereby, a method of forming an optically functional layer which can easily flatten and can avoid two kinds of portions from blotting each other can be provided besides the effect any of the third to sixth aspects of the present invention.

According to the ninth aspect of the present invention, after development, heating is performed at a specific range of temperature, thereby, a method of forming an optically functional layer which can more stabilize the orientation of layer can be provided besides the effect of the seventh aspect of the present invention.

According to the tenth aspect of the present invention, the optically functional layer of the first or second aspect of the present invention (particularly, an optical retardation control layer) is laminated inside of a cell, thereby, a liquid crystal display element wherein the durability such as heat resistance, chemical resistance or the like of the optically functional layer is improved can be provided.

According to the eleventh aspect of the present invention, a color filter layer is laminated, thereby, a liquid crystal display element wherein a color display is capable can be provided besides the effect of the tenth aspect of the present invention.

According to the twelfth aspect of the present invention, a liquid crystal display element which can provide plural function of optically functional layers can be provided besides the effect of the tenth to eleventh aspect of the present invention.

According to the thirteenth aspect of the present invention, a liquid crystal display element which can sufficiently exhibit each function of two optically functional layers can be provided besides the effect of the twelfth aspect of the present invention.

According to the fourteenth aspect of the present invention, a liquid crystal display element wherein there is no blur in boundary of a transparent portion and the function of each optically functional layer is conjugated can be provided besides the effect of the thirteenth aspect of the present invention.

BRIEF DESCRIPTION OF THE DRAWINGS

In the accompanied drawings,

FIG. 3 is a view showing an example of a laminated structure of a liquid crystal display element having a color filter layer and an optical retardation control layer on the electrode substrate side having TFT or the like.

The sign in each figure refers to the following: 1 a liquid crystal display element; 2(2A, 2B) a polarizer; 3(3A, 3B) a phase difference plate; 4(4A, 4B) a substrate; 5 a color filter layer; 6(6A, 6B, 6C) an orientation layer; 7 an optical retardation control layer; 8 a transparent electrode layer; 9 a liquid crystal layer; 10 an electrode layer (TFT); 11 a backlight

DETAILED DESCRIPTION OF THE PREFERRED EMBODIMENT

Figure 1:
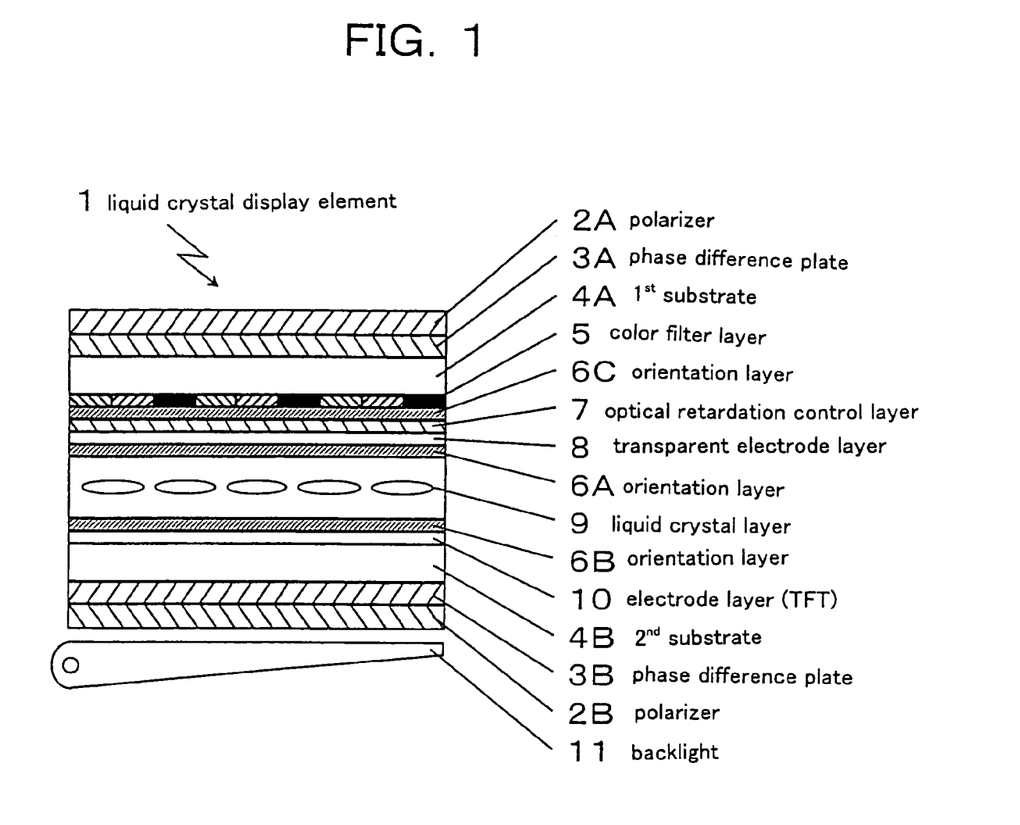
FIG. 1 is a view showing an example of a laminated structure of a liquid crystal display element having a color filter layer and an optical retardation control layer on the transparent electrode substrate side in this order.

FIG. 1 is a view showing an example of a laminated structure of a liquid crystal display element using an optically functional layer of the present invention as an optical retardation control layer, wherein the upper side of the view is an observation side. In the liquid crystal display element 1, as shown in FIG. 1, the first substrate 4A and the second substrate 4B are disposed parallel to face each other. On the lower surface side of the first substrate 4A on the upper side of the view, a transparent electrode layer 8 and an orientation layer 6A are laminated in order. On the upper surface side of the second substrate 4B on the lower side of the view, an electrode layer 10, for example, which is TFT, and an orientation layer 6B are laminated in order. A liquid crystal layer 9 is disposed to be sealed between the orientation layer 6A of the first substrate and the orientation layer 6B of the second substrate. A backlight 11, which radiates whole screen, is arranged below the liquid crystal display element 1.

A color filter layer 5 and an optical retardation control layer 7 are laminated in order between the lower surface side of the first substrate 4A and a transparent electrode layer 8. An orientation layer 6C is laminated between the color filter layer 5 and the optical retardation control layer 7. A polarizer 2A is laminated on the upper surface side of the first substrate 4A disposing a phase difference plate 3A therebetween, if required. Also, a polarizer 2B is laminated on the lower surface side of the second substrate 4B disposing a phase difference plate 3B therebetween, if required. The color filter layer 5 is formed, if required.

Figure 2:
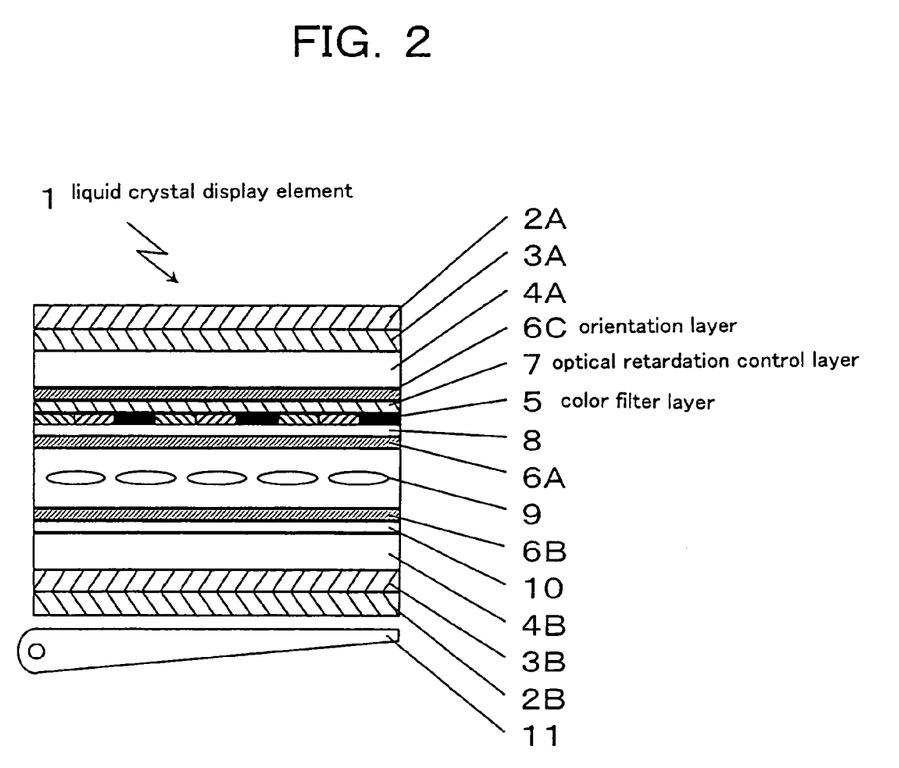
FIG. 2 is a view showing an example of a laminated structure of a liquid crystal display element having a color filter layer and an optical retardation control layer on the transparent electrode substrate side in the opposite order compared to FIG. 1.

When the liquid crystal display element 1 has the color filter layer 5, as shown in FIG. 2, the order of laminating the color filter layer 5 and the optical retardation control layer 7 may be switched so that the optical retardation control layer 7 and the color filter layer 5 are laminated in this order from the first substrate 4A side. The orientation layer 6C may be laminated between the optical retardation control layer 7 and the first substrate 4A.

Figure 3:
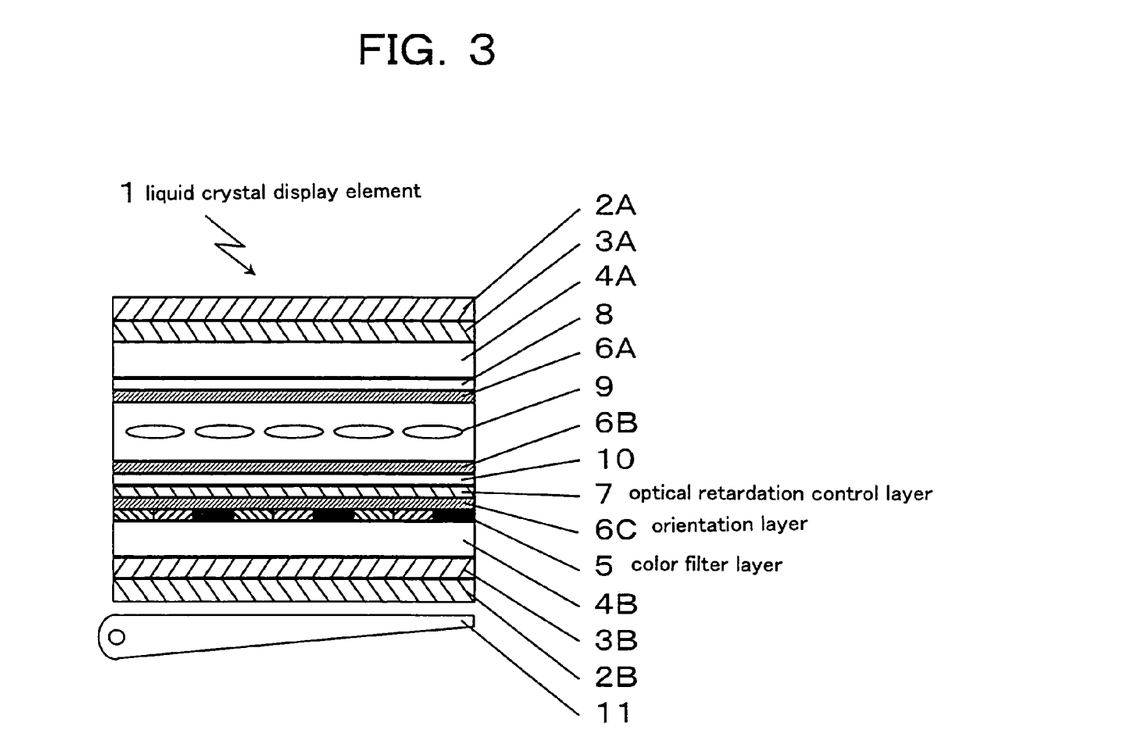

The liquid crystal display element 1, as shown in FIG. 1 and FIG. 2, may have the optical retardation control layer 7, and if required, the color filter layer 5 laminated on the first substrate 4A side. Also, as shown in FIG. 3, these layers may be laminated on the second substrate 4B side. In this case, as shown in FIG. 3, the color filter layer 5 and the optical retardation control layer 7 may be laminated on the liquid crystal layer 9 side of the second substrate 4B from the second substrate 4B side. Also, the order of laminating the color filter layer 5 and the optical retardation control layer 7 may be switched. Regardless of order of laminating the color filter layer 5 and the optical retardation control layer 7, the orientation layer 6C may be laminated directly below the second substrate side of the optical retardation control layer 7.

In the liquid crystal display element 1 explained with reference to FIGS. 1 to 3, the color filter layer 5 maybe omitted, however, it is better to form the color filter layer 5 in the case of color display. Generally, the color filter layer 5 comprising color patterns of red, green and blue can perform full color display. If required, further, black matrix may be formed in a predetermined pattern form.

The optically functional layer applicable to the liquid crystal display element 1 as the optical retardation control layer 7 may be comprised of a cured product by polymerization of a polymerizable liquid crystal composition containing α-amino alkylphenone based photopolymerization initiator, particularly, 2-methyl-1[4-(methylthio)phenyl]-2-morpholinopropane-1-one represented by the Formula (1) and/or 2-benzyl-2-dimethylamino-1-(4-morpholinophenyl)-butanone-1 represented by the Formula (2).

The cured product by polymerization of a polymerizable liquid crystal composition comprising an optically functional layer in the present invention is a kind of so-called a crystalline polymer. The crystalline polymer is a polymer wherein a liquid crystal state is immobilized at room temperature. As the crystalline polymer, for example, there is a polymer wherein a liquid crystal monomer having a polymerizable group in the molecular structure is crosslinked, and cured by maintaining optically anisotropy before crosslinking. Or, as other crystalline polymer, there is a polymer having glass transition temperature, which exhibits a liquid crystal phase when heated to glass transition temperature or higher, becomes a glassy state when quenched and maintains liquid crystal regularity at a glassy state. Taking arrangement of the optically functional layer inside of a liquid crystal cell into consideration, it is preferable to use a cured product by polymerization type liquid crystal having a liquid crystal monomer crosslinked, or preferably three-dimensionally crosslinked.

The optical retardation control layer 7 may be comprised of the cured product by polymerization of a composition for forming an optical retardation control layer, which is a polymerizable liquid crystal composition, containing a specific α-amino alkylphenone based photopolymerization initiator, particularly, the photopolymerization initiator represented by the Formula (1) and/or the photopolymerization initiator represented by the Formula (2). Hence, the optical retardation control layer 7 contains an unreacted product of these photopolymerization initiators derived from the composition for forming an optical retardation control layer and/or a resolvent wherein these photopolymerization initiators derived from the composition for forming an optical retardation control layer are cleaved. The composition for forming an optical retardation control layer of the present invention basically has a liquid crystal monomer and a photopolymerization initiator compounded, or in addition to the above, a chiral agent, that is, a liquid crystal monomer, a chiral agent and a photopolymerization initiator compounded. In any cases, the polymerizable liquid crystal composition may have further an additive, for example, a surfactant or the like compounded. If required, the composition for forming an optical retardation control layer may have a solvent compounded and be diluted.

As the polymerizable liquid crystal monomer, for example, conventional one disclosed in Kohyo (Japanese Unexamined Patent Publication) No. Hei 10-508882 can be used. The chiral agent may have or not have a polymerizable group. However, in view of reliability such as heat resistance, chemical resistance or the like, it is preferable to use a polymerizable chiral agent. For example, conventional one disclosed in JP-A No. Hei 7-258638, JP-A No. 2000-95883, JP-A No. Hei 8-245960, or JP-A No. Hei 9-53074 can be used. More specifically, there may be, for example, a polymerizable nematic liquid crystal monomer such as the following formulas (3) to (13), and a chiral agent such as the following formulas (14) to (16). Also, as the chiral agent, a chiral dopant liquid crystal (manufactured by Merck & Co., Inc., Germany; product No. S-811) or the like may be used.

(3)

(4)

(5)

(6)

(7)

-continued

(8)

(9)

(10)

(11)

(12)

(13)

(14)

-continued (xxii)

(xxiii)

(xxiv)

As for each formula mentioned above, "a" to "e" in the Formulas 13 to 16 refer to an integer number respectively which is a number of methylene group (chain length of alkylene group), wherein "a" and "b" are respectively 2 to 12, preferably 4 to 10, more preferably 6 to 9, "c" and "d" are respectively 2 to 12, preferably 4 to 10, more preferably 6 to 9, and further "e" is 2 to 6.

"R" in the Formula 14 is hydrogen or a methyl group. "Y" in the Formula 14 and the Formula 15 is any of the Formula i to the Formula xxiv, preferably any of the Formula i, the Formula ii, the Formula iii, the Formula v and the Formula vii.

In the present invention, a surfactant may be compounded in a polymerizable liquid crystal composition. A surfactant which has the excluded volume effect is preferable, that is, a surfactant which can sterically control the spatial orientation state of air interface at layer surface when a layer is formed by applying the composition for forming an optical retardation control layer. By compounding such a surfactant, the orientation of layer surface improves. Specifically, a nonionic surfactant is preferable and can be selected from a conventional nonionic surfactant to use.

If the composition for forming an optical retardation control layer is basically comprised of the polymerizable liquid crystal monomer and the photopolymerization initiator, the compounding ratio is preferably 0.1 to 10 parts by weight of the photopolymerization initiator with respect to 100 parts by weight of the polymerizable liquid crystal monomer. If the compounded part of the photopolymerization initiator is less than the above mentioned range, the optical retardation control layer 7 formed by using the composition for forming an optical retardation control layer may not be able to obtain sufficient durability such as heat resistance, chemical resistance or the like. Also, if the compounded part of the photopolymerization initiator exceeds the above mentioned range, a desired phase difference may not be able to be obtained as the photopolymerization initiator inhibits the orientation of liquid crystal.

If the composition for forming an optical retardation control layer is basically comprised of the polymerizable liquid crystal monomer, the polymerizable chiral agent and the photopolymerization initiator, generally, the compounding ratio is 1 to 20 parts by weight of the polymerizable chiral agent with respect to 100 parts by weight of the polymerizable liquid crystal monomer, and 0.1 to 10 parts by weight of the photopolymerization initiator with respect to 100 parts by weight of the polymerizable liquid crystal monomer. The chiral agent may be compounded in the range that the orientation of the liquid crystal is not disturbed.

When the obtained optically functional layer is used as the color filter layer, a selective reflection wavelength range changes due to the compounding ratio of the polymerizable liquid crystal monomer and the chiral agent. If the optically functional layer is used as the phase difference plate, it is necessary to adjust the compounding ratio of the polymerizable liquid crystal monomer and the chiral agent so that the selective reflection wavelength becomes 350 nm or less.

In the composition to form any of the above optically functional layers, the surfactant is compounded 0.01 to 10 parts by weight with respect to 100 parts by weight of the polymerizable liquid crystal monomer. If the compounded part of the surfactant is less than the above range, the excluded volume effect may be not sufficient. Also, if the compounded part of the surfactant exceeds the above range, the orientation of liquid crystal may be deteriorated.

In order to form the optical retardation control layer 7 with the use of the composition for forming an optical retardation control layer of the present invention, which is a polymerizable liquid crystal composition, the composition for forming an optical retardation control layer may be applied on an appropriate substrate by using a conventional coating method or printing method, and ionizing radiation, in this case preferably ultraviolet irradiation, may be performed on the applied layer of composition for forming an optical retardation control layer to cure the component in the composition for forming an optical retardation control layer by polymerization.

Herein, as the first substrate 4A and the second substrate 4B, there may be used inorganic base material such as glass, silicon, quartz or the like, or the following organic base material(base material made of organic material). That is, there may be organic base material made of acrylic resin such as polymethyl methacrylate or the like; polyvinyl alcohol, polypropylene, cellulose, triacetyl cellulose, or a partially sponified product thereof; epoxy resin, phenol resin, polyamide, polyacetal, polyethylene terephthalate, polybutylene terephthalate, polyethylene naphthalate, or syndiotactic polystyrene; polyphenylene sulfide, polyether ketone, polyether ether ketone, poly ketone sulfide, polyphenylene oxide, fluororesin, polyether nitrile or the like; polycarbonate, modified polyphenylene ether, polycyclohexene, polynorbornane based resin or the like; or polysulfone, polyether sulfone, polyarylate, polyamide imide, polyether imide, thermoplastic polyimide or the like, however, organic base material made of general plastics can be also used.

The above organic base material may be subjected to uniaxial orientation or biaxial orientation, or may be a laminate wherein arbitrarily two or more kinds are laminated. There is no particular limit in thickness of the first substrate 4A and the second substrate 4B. According to uses, for example, a substrate having thickness of about 5 μm to 1 mm is used.

The first substrate 4A or the second substrate 4B may be an active substrate such as a TFT substrate, a MIM substrate or the like. TFT refers to a thin-film transistor, which may be an amorphous Si-TFT, a high temperature polycrystalline Si-TFT, a low temperature polycrystalline Si-TFT or the like, and MIM refers to Metal/Insulator/Metal.

As explained with FIGS. 1 to 3, the black matrix or the color filter layer 5 may be preliminarily laminated on the first substrate 4A or the second substrate 4B prior to laminating the optical retardation control layer 7. The black matrix and/or the color filter layer 5 may be laminated after laminating the optical retardation control layer 7.

The black matrix can be formed in a predetermined pattern form by applying and once solidifying a coating material type resin composition containing a black colorant on a surface, and then, applying a photoresist thereon and subjecting to exposure, or performing coating, exposure and development with the use of the coating material type photosensitive resin composition containing a black colorant. Hence, the black matrix can be comprised of a resin composition containing a black colorant.

Alternatively, the black matrix may be an inorganic material thin layer such as two-layer chromium black matrix comprising a laminated structure of CrOx/Cr ("x" represents a given number, "/" represents lamination.), three-layer chromium black matrix comprising a laminated structure of CrOx/CrNy/Cr (x and y represent a given number) having reflectivity further decreased or the like. The black matrix of an inorganic material thin layer may also be formed by a method comprising steps of forming a thin layer of metal, metal oxide, metal nitride or the like by various methods such as deposition, ion plating, sputtering or the like and developing a certain pattern utilizing photolithography method, an electroless plating method, a printing method using black inorganic material ink composition, or the like. When laminating the black matrix, it is preferable to laminate alignment mark together with the black matrix to utilize for alignment of each layer.

The color filter layer 5 is generally comprised of transparent coloring patterns of red, green and blue respectively. Each transparent coloring pattern is comprised of resin composition wherein colorant is solved or dispersed, preferably pigment particle is dispersed. The color filter layer 5 may be formed by preparing an ink composition colored in a predetermined color, and printing for every coloring pattern. It is, however, preferable to form the color filter layer 5 by a photolithography method with the use of a coating material type photosensitive resin composition containing a colorant of a predetermined color.

The optical retardation control layer 7 is preferably laminated on a surface wherein an orientation layer is preliminarily laminated. The orientation layer is for arranging the crystalline polymer comprising the optical retardation control layer, which is an upper layer, in a predetermined direction. The orientation layer may be formed in such manner that after resin composition wherein resin such as polyamide resin, polyimide resin, polyvinyl alcohol resin or the like is solved is applied and dried to form a layer made of the resin, rubbing is performed wherein the layer is rubbed in a predetermined direction with a metal roller or the like wrapped by a cloth made of rayon, cotton, polyamide, polymethyl methacrylate or the like. As the orientation layer, there may be utilized $SiO_2$ or the like, an oblique evaporation layer of organic material or the like, further, a homeotropic layer of organic material such as organic silane or the like and the homeotropic layer with rubbing or the like.

The optical retardation control layer 7 may be formed in such manner that the composition for forming an optical retardation control layer, solved or diluted with a solvent if required, is applied on an objective substrate, or on the orientation layer on the substrate or the like by spin coating, die coating, slit coating, or other appropriate method, and exposed and polymerized by ultraviolet irradiation or the like to form a layer of a cured product by polymerization. As the ultraviolet ray, mercury excitation light source such as a low-pressure mercury-vapor lamp, a medium-pressure mercury-vapor lamp, a high-pressure mercury-vapor lamp or the like, or mercury xenon light source or the like may be used. It is preferable to use a light source which has strong peak in a wavelength band having high sensitivity of a using polymerization initiator. It is also possible to polymerize by ultraviolet irradiation instead of electron beam radiation.

In the present invention, when polymerizing the composition for forming an optical retardation control layer as mentioned above, it is preferable not to perform in the air, but under inert atmosphere. In radical polymerization, generated radical loses activity due to presence of oxygen, thus, in the step of ionizing radiation to polymerize, it is preferable to decrease partial pressure of oxygen as much as possible, or to perform ionizing radiation inside of chamber filled with inert gas containing no oxygen. In this way, the optical retardation control layer 7 can be sufficiently cured by polymerization not only inside but also to the surface.

As the inert gas, nitrogen, argon or the like can be used, and other gas besides the above may also be used. As atmosphere upon polymerization, it is not preferable to use air containing oxygen in large quantity, but it is preferable to use gas not containing oxygen substantially, that is, gas whose oxygen concentration is 1.0% or less, more preferably, gas whose oxygen concentration is 0.1% or less.

When polymerizing the composition for forming an optical retardation control layer, the temperature of a layer wherein the composition for forming an optical retardation control layer is applied is preferably in the range of room temperature (for example 25° C.) or higher and the temperature in which the polymerizable liquid crystal monomer becomes transparent or lower. If polymerized with heating in such temperature range, the polymerization rate improves and density of the cured product by polymerization improves so that the durability such as heat resistance, chemical resistance or the like improves, thus it is preferable.

The optical retardation control layer 7 may be formed by applying composition for forming and ultraviolet irradiation or the like as mentioned above. Therefore, the optical retardation control layer 7 may be formed in pattern form in such manner that after the exposure in pattern form upon ultraviolet irradiation or the like, unradiated portion at exposure is solved to remove. This forming of the optical retardation control layer 7 in pattern form may be utilized for forming the optical retardation control layer 7 only in a predetermined range, for example, a display part of screen, or maybe utilized for forming the optical retardation control layer 7 which has different phase difference amount for each pixel. The composition for forming an optical retardation control layer of the present invention can prevent deterioration due to development since the radiated portion at exposure is cured by polymerization.

The development is generally performed with the use of a solvent, alkali solution or the like. Generally, after the treatment using developing solution, rinsing process to rinse the surface after development, and drying process after the rinsing process follow. It is preferable to heat in the range of room temperature or higher and the temperature in which the polymerizable liquid crystal monomer becomes transparent or lower after rinsing process since it can also dry at the same time and stabilize the orientation of the liquid crystal layer.

The optical retardation control layer 7 of the present invention is preferably formed by performing ultraviolet irradiation at the temperature in which the polymerizable liquid crystal monomer inside of polymerizable liquid-phase composition becomes transparent or lower. Two kinds of portion, which is anisotropic portion and isotropic portion, can be formed in one layer formed by the polymerizable liquid crystal composition in such manner that after the above mentioned exposure to form pattern, heating is performed to the temperature in which the polymerizable liquid crystal monomer becomes transparent to make uncured portion after exposure to form pattern transparent, and after making transparent, ultra violet irradiation is performed to cure the uncured portion.

In this method, uncured portion (unradiated portion) left after exposure to form pattern is not removed by development, but it is made transparent, and further cured by ultraviolet irradiation. Thereby, there is no difference in level between two kinds of portions and the layer is flat since the optical retardation control layer 7 and the surrounding part of transparent layer is a same layer as a whole, and boundary of two kinds of portions can be clearly formed without blur of each other since all portions are cured by ultraviolet irradiation. As mentioned in SID' 03 digest 8.1 (78-81), this can be applied to semi-transparent LCD to change phase difference amount of a transparent portion and a reflection portion. However, as areas with and without phase difference amount are formed in one layer, conventionally, blur easily occurs in boundary, thus, a method to pattern without blur was desired.

The optical retardation control layer 7 of the present invention may be a single layer or a laminate of two or more layers. In the case of the laminate of two or more layers, there may be a laminate of a nematic liquid crystal layer and a cholesteric liquid crystal layer, a laminate of nematic liquid crystal layers, a laminate having an orientation layer between nematic liquid crystal layers, a laminate of nematic liquid crystal layers having different slow axes to each other, or the like.

In the case of forming the above mentioned two kinds of portions to each layer of two or more layers, it is preferable to laminate so as to overlap each isotropic portion. If the optical retardation control layer 7 is a laminate with two or more layers, it is preferable that the layers directly contact to each other.

Further, two or more polymerizable liquid crystal composition layers of mutually different cured product by polymerization may be laminated to form an optically functional layer other than the optical retardation control layer 7. Alternatively, two or more polymerizable liquid crystal composition layers of mutually different in the cured product by polymerization may be laminated to laminate two or more kinds of optically functional layers (for example, a combination of the optical retardation control layer 7 and the color filter layer or a combination of the optical retardation control layer 7 and the phase difference plate) so as to contact directly or disposing other layer therebetween.

The substrate having the optical retardation control layer formed by the method of the present invention may laminate a protecting layer, if required, and thereafter may form an orientation layer, thereby, one substrate which comprises a liquid crystal display element can be formed.

EXAMPLES

Example 1

As composition for forming retardation layer, each component of the following composition was mixed and solved to prepare and used for spin coating on a glass substrate with an orientation layer having rubbing treatment. After removing a solvent, the coating layer after orientation treatment was subject to ultraviolet irradiation for photopolymerization at room temperature in the air with the use of ultra-high-pressure mercury-vapor lamp (output: 20 mW/cm$^2$, wavelength: 365 nm) under the condition of radiating amount of 1000 mJ/cm$^2$. As the result, the thickness of the obtained retardation layer was 1.03 μm, and retardation was 143 nm measured with a colorimetric light at wavelength of 589 nm.

Further, the obtained retardation layer was subject to curing treatment in a clean oven under condition of temperature of 230° C. and time of 1 hour, a retardation layer having slow axes in in-plain direction of layer was obtained. The thickness of the retardation layer after the curing treatment was 0.98 μm, and retardation was 119 nm when measured with a colorimetric light at wavelength of 589 nm. The retardation values when measured with the colorimetric light at wavelength of 589 nm of the retardation layer obtained by curing treatment after heating in a clean oven at 230° C. for 1 hour, 2 hour and 4 hour are shown later. With regard to the obtained layers in the following Examples and Comparative examples, similar heating test was conducted after curing treatment.

<Composition for Forming a Retardation Layer>

| | |
|---|---|
| Liquid crystal monomer represented by the Formula (10) | 100 parts by weight |
| Photopolymerization initiator represented by the Formula (1) | 5 parts by weight |
| Surfactant (polycyclohexyl methacrylic ester) | 0.1 parts by weight |
| Solvent (cyclohexanone) | 200 parts by weight |

Example 2

Except that a photopolymerization initiator represented by the Formula (2) was used as a photopolymerization initiator, a retardation layer was obtained with the compounding ratio of the composition for forming a retardation layer and the forming condition or the like similar to Example 1. The thickness of the obtained retardation layer after photopolymerization by ultraviolet irradiation was 1.02 μm and retardation was 132 nm when measured with a colorimetric light at wavelength of 589 nm.

The obtained retardation layer was further subject to curing treatment in a clean oven under condition of temperature of 230° C. and time of 1 hour, and a retardation layer having slow axes in in-plain direction of layer was obtained. The thickness of the retardation layer after curing treatment was 0.96 μm, and retardation was 119 nm when measured with a colorimetric light at wavelength of 589 nm.

Example 3

Except that the coating layer after orientation treatment was subject to ultraviolet irradiation at 60° C. and photopolymerization, a retardation layer was obtained similarly as in Example 2. The thickness of the retardation layer obtained by photopolymerization by ultraviolet irradiation was 1.05 μm, and retardation was 122 nm when measured with a colorimetric light at wavelength of 589 nm.

The obtained retardation layer was further subject to curing treatment in a clean oven under condition of temperature of 230° C. and time of 1 hour. The thickness of the retardation layer was 1.03 μm, and retardation was 119 nm when measured with a colorimetric light at wavelength of 589 nm. The difference between the measured value and the retardation value after photopolymerization was small.

Example 4

Except that the coating layer after orientation treatment was subject to ultraviolet irradiation under nitrogen atmosphere at 60° C. and photopolymerization, a retardation layer was obtained similarly as in Example 2. The thickness of the retardation layer obtained by photopolymerization by ultraviolet irradiation was 1.07 μm, retardation was 125 nm when measured with a colorimetric light at wavelength of 589 nm.

The obtained retardation layer was further subject to curing treatment in a clean oven under condition of temperature of 230° C. and time of 1 hour. The thickness of the retardation layer was 1.06 μm, and retardation was 123 nm when measured with a colorimetric light at wavelength of 589 nm. The difference between the measured value and the retardation value after photopolymerization was small.

Comparative Example 1

Except that α-hydroxyketone based 1-hydroxy-cyclohexyl-phenyl-ketone (manufactured by Chiba Specialty Chemicals, Inc.; product name: Irgacure 184) was used as a photopolymerization initiator, a retardation layer was obtained with the compounding ratio of the composition for forming a retardation layer and the forming condition or the like similar to Example 1. The thickness of the obtained retardation layer was 1.02 μm and retardation was 132 nm when measured with a colorimetric light at wavelength of 589 nm.

The obtained retardation layer was further subject to curing treatment in a clean oven under condition of temperature of 230° C. and time of 1 hour. The thickness of the retardation layer was 0.85 μm, and retardation was 46 nm when measured with a colorimetric light at wavelength of 589 nm. The difference between the measured value and the retardation value after photopolymerization was significantly large.

In the following Table 1, the retardation (unit: nm) of the retardation layer obtained in Examples 1 to 4 and Comparative example by curing treatment after heating in a clean oven at 230° C. for 1 hour, 2 hour and 4 hour are shown.

TABLE 1

| time | Example 1 | Example 2 | Example 3 | Example 4 | Comparative example 1 |
|---|---|---|---|---|---|
| | | | | | (unit: nm) |
| Before heating | 143 | 132 | 122 | 125 | 132 |
| After first heating | 119 | 119 | 119 | 123 | 46 |
| 1 hour extension of heating | 116 | 118 | 118 | 122 | 30 |
| 2 hour extension of heating | 115 | 116 | 118 | 122 | 25 |
| 4 hour extension of heating | 115 | 116 | 117 | 122 | 19 |

What is claimed is:

1. A liquid crystal display element comprising a liquid crystal cell for driving which is comprised of two substrates disposed to face each other, an electrode layer laminated on inner side of at least one of the substrates, an orientation layer laminated on top surface of the inner side of both substrates, and a liquid crystal layer disposed between the orientation layers to be sealed, at least one polarizer disposed at outer side of the liquid crystal cell for driving, and an optical retardation control layer laminated on the liquid crystal layer side of any one of the substrates, wherein the optical retardation control layer comprising a cured product by polymerization of a polymerizable liquid crystal composition containing a polymerizable liquid crystal monomer, a surfactant and at least one of a photopolymerization initiator represented by Formula (1) and a photopolymerization initiator represented by Formula (2); and is formed in a predetermined pattern form:

2. The liquid crystal display element according to claim 1, further comprising a color filter layer laminated on the liquid crystal layer side of any one of the substrates.

3. The liquid crystal display element according to claim 1, wherein two or more optical retardating control layers are laminated.

4. The liquid crystal display element according to claim 3, wherein two optical retardation control layers are directly laminated on each other.

5. The liquid crystal display element according to claim 1, wherein the optical retardation control layer is formed by the steps of: laminating a polymerizable liquid crystal composition layer comprising a polymerizable liquid crystal composition containing a polymerizabie liquid crystal monomer, a surfactant and at least one of a photopolymerization initiator represented by Formula (1) and a photopolymerization initiator represented by Formula (2) on the side to be faced to the liquid crystal layer of any one of the substrates; subjecting the polymerizable liquid crystal composition layer to ionizing radiation in a predetermined pattern when the temperature of the polymerizable liquid crystal composition is in the range of room temperature or higher and at a temperature lower than the temperature in which the polymerizable liquid crystal monomer becomes transparent to be partially cured; and solving unradiated portion of the polymerizable liquid crystal composition layer to remove.

6. A method of producing an optical retardation control layer comprising the steps of: laminating a polymerizable liquid crystal composition layer comprising a polymerizable liquid crystal composition containing a polymerizable liquid crystal monomer, a surfactant and at least one of a photopolymerization initiator represented by Formula (1) and a photopolymerization initiator represented by Formula (2) on a substrate; subjecting the polymerizable liquid crystal composition layer to ionizing radiation in a predetermined pattern when the temperature of the polymerizable liquid crystal composition is in the range of room temperature or higher and at a temperature lower than the temperature in which the polymerizable liquid crystal monomer becomes transparent to be partially cured; and solving unradiated portion of the polymerizable liquid crystal composition layer to remove:

(1)

(2)

7. The method of producing the optical retardation control layer according to claim 6, wherein after removing the unradiated portion, heating is performed at a temperature in the range of room temperature or higher and a temperature lower than the temperature in which the polymerizable liquid crystal monomer becomes transparent.

* * * * *